United States Patent
Singh et al.

(10) Patent No.: US 11,856,412 B2
(45) Date of Patent: Dec. 26, 2023

(54) TELECOMMUNICATIONS NETWORK PLANNING SYSTEM

(71) Applicant: T-Mobile USA, Inc., Bellevue, WA (US)

(72) Inventors: Gurpreet Singh, Manteca, CA (US); Stephen Todd Vancleve, Walnut Creek, CA (US); Pankaj Saxena, Sammamish, WA (US); Ashwini Kumar, Chandler, AZ (US)

(73) Assignee: T-Mobile USA, Inc., Bellevue, WA (US)

( * ) Notice: Subject to any disclaimer, the term of this patent is extended or adjusted under 35 U.S.C. 154(b) by 75 days.

(21) Appl. No.: 17/554,952

(22) Filed: Dec. 17, 2021

(65) Prior Publication Data

US 2023/0199511 A1    Jun. 22, 2023

(51) Int. Cl.
*H04W 16/18* (2009.01)
*H04W 24/02* (2009.01)
*H04W 28/02* (2009.01)

(52) U.S. Cl.
CPC .......... *H04W 16/18* (2013.01); *H04W 24/02* (2013.01); *H04W 28/021* (2013.01)

(58) Field of Classification Search
CPC ... H04W 24/02; H04W 28/021; H04W 16/18; H04W 16/22; H04W 24/08; H04W 36/0009; H04W 48/18; H04W 4/08; H04W 52/0261; H04W 4/029; H04W 76/14; H04W 52/0264; H04W 4/46; H04W 92/045; H04W 48/10; H04W 68/005; H04W 48/16; H04W 4/021; H04W 4/024; H04W 4/44; H04W 88/06; H04W 88/04; H04W 74/0816; H04W 84/005; H04W 8/005; H04W 52/0216; H04B 7/0617

See application file for complete search history.

(56) References Cited

U.S. PATENT DOCUMENTS

| | | |
|---|---|---|
| 5,734,709 A | 3/1998 | Dewitt et al. |
| 5,987,322 A | 11/1999 | Gupta et al. |
| 6,112,091 A | 8/2000 | Puijenbroek et al. |
| 6,343,290 B1 | 1/2002 | Cossins et al. |
| 6,396,810 B1 | 5/2002 | Hebel |
| 6,697,477 B2 | 2/2004 | Fleischer et al. |

(Continued)

*Primary Examiner* — Jung Liu
(74) *Attorney, Agent, or Firm* — Perkins Coie LLP

(57) ABSTRACT

Systems and methods to identify a growth classification/categorization for a geographic area that helps a network provider to solve for what types of planning opportunities are available at various area granularities is disclosed. The system computes values for a set of growth criteria for a geographic area. The growth criteria are related to planning, usability, customer experience, sales, population, and so on. Based on the growth-criteria values, the system identifies a classification/categorization for the area. For example, the system classifies an area as an invest area (e.g., requiring engineering action), a grow area (e.g., requiring sales action/being sales ready), a defend area (e.g., requiring engineering and sales actions to continue current trend), or a fix area (e.g., likely requiring both engineering and sales actions to improve current trend). Based on the area classification, the system can then provide actionable insights to drive improvement in network coverage and customer experience.

20 Claims, 12 Drawing Sheets

(56) References Cited

U.S. PATENT DOCUMENTS

| | | | |
|---|---|---|---|
| 6,912,270 B1 | 6/2005 | Drury et al. | |
| 6,914,525 B2 | 7/2005 | Rao et al. | |
| 7,725,108 B2 | 5/2010 | Vincent | |
| 7,840,219 B2 | 11/2010 | Ludovico et al. | |
| 8,036,664 B2* | 10/2011 | Khetawat | H04W 24/02 455/454 |
| 8,150,397 B2* | 4/2012 | Khetawat | H04W 12/041 455/435.2 |
| 8,204,502 B2* | 6/2012 | Khetawat | H04W 8/04 455/445 |
| 8,355,600 B1 | 1/2013 | Haught et al. | |
| 8,447,810 B2 | 5/2013 | Roumeliotis et al. | |
| 8,472,950 B2 | 6/2013 | Bao et al. | |
| 8,526,961 B2 | 9/2013 | Sanders et al. | |
| 8,560,670 B2 | 10/2013 | Mcnaughton et al. | |
| 8,615,255 B1 | 12/2013 | Zang et al. | |
| 9,042,254 B2 | 5/2015 | Soulie | |
| 9,071,705 B2 | 6/2015 | Isaksson | |
| 9,119,059 B2 | 8/2015 | Pison et al. | |
| 9,286,705 B1 | 3/2016 | Haught et al. | |
| 9,363,146 B2 | 6/2016 | Cossins et al. | |
| 9,408,118 B2 | 8/2016 | Karimli et al. | |
| 9,408,180 B2 | 8/2016 | Karimli et al. | |
| 9,462,613 B2 | 10/2016 | Klatt | |
| 9,599,476 B2 | 3/2017 | Mund et al. | |
| 9,706,411 B2 | 7/2017 | Goswami et al. | |
| 9,763,169 B2 | 9/2017 | Mcquaid | |
| 9,774,994 B2 | 9/2017 | Chen et al. | |
| 10,187,268 B2 | 1/2019 | Cossins et al. | |
| 10,225,746 B2 | 3/2019 | Mohammed et al. | |
| 10,229,415 B2 | 3/2019 | Huyi et al. | |
| 10,341,878 B2 | 7/2019 | Bertrand et al. | |
| 10,375,516 B2 | 8/2019 | Colonna et al. | |
| 10,397,737 B2 | 8/2019 | Colonna et al. | |
| 10,489,806 B2 | 11/2019 | Nadiadi et al. | |
| 10,490,890 B2 | 11/2019 | Kolokotronis | |
| 10,531,309 B1 | 1/2020 | Li et al. | |
| 10,555,191 B1 | 2/2020 | Jat et al. | |
| 10,555,192 B2 | 2/2020 | Yang et al. | |
| 10,601,684 B2 | 3/2020 | Hashmi et al. | |
| 10,623,256 B2 | 4/2020 | Zawadzki et al. | |
| 10,631,198 B2 | 4/2020 | Zhang | |
| 10,644,979 B2 | 5/2020 | Samadi | |
| 10,687,230 B2 | 6/2020 | Mueller et al. | |
| 10,735,962 B2 | 8/2020 | Mohammed et al. | |
| 10,779,183 B2 | 9/2020 | Li et al. | |
| 10,785,123 B2 | 9/2020 | Gonguet | |
| 10,791,468 B2 | 9/2020 | Raj et al. | |
| 10,808,502 B2 | 10/2020 | Yang et al. | |
| 10,817,889 B2 | 10/2020 | Zachariah et al. | |
| 10,970,724 B2 | 4/2021 | Halstead et al. | |
| 10,979,910 B2 | 4/2021 | Li et al. | |
| 10,993,081 B2 | 4/2021 | Mehran et al. | |
| 11,006,307 B2 | 5/2021 | Yoon | |
| 11,089,485 B2 | 8/2021 | Wainer et al. | |
| 11,653,292 B2* | 5/2023 | Azizi | H04W 76/14 370/329 |
| 2002/0027567 A1 | 3/2002 | Niamir | |
| 2002/0183075 A1 | 12/2002 | Fauconnier | |
| 2003/0112954 A1 | 6/2003 | Fleischer et al. | |
| 2004/0075552 A1 | 4/2004 | Rao et al. | |
| 2004/0102893 A1 | 5/2004 | Atkinson et al. | |
| 2004/0260720 A1 | 12/2004 | Cossins et al. | |
| 2007/0026886 A1 | 2/2007 | Vincent | |
| 2008/0037497 A1 | 2/2008 | Ludovico et al. | |
| 2008/0076419 A1* | 3/2008 | Khetawat | H04L 41/0806 370/328 |
| 2008/0076425 A1* | 3/2008 | Khetawat | H04W 12/069 455/436 |
| 2008/0305792 A1* | 12/2008 | Khetawat | H04W 12/122 455/435.1 |
| 2009/0055719 A1 | 2/2009 | Cossins et al. | |
| 2009/0196185 A1 | 8/2009 | Stipanovich et al. | |
| 2010/0009671 A1 | 1/2010 | Goldman et al. | |
| 2010/0056163 A1 | 3/2010 | Schmidt et al. | |
| 2010/0069086 A1 | 3/2010 | Ahlin | |
| 2011/0314145 A1* | 12/2011 | Raleigh | H04W 48/16 709/224 |
| 2012/0077523 A1 | 3/2012 | Roumeliotis et al. | |
| 2012/0284737 A1 | 11/2012 | Savoor et al. | |
| 2012/0295536 A1 | 11/2012 | Klatt | |
| 2013/0005297 A1 | 1/2013 | Sanders et al. | |
| 2013/0040672 A1 | 2/2013 | Pison et al. | |
| 2013/0115943 A1 | 5/2013 | Bao et al. | |
| 2013/0179224 A1 | 7/2013 | Nadiadi et al. | |
| 2013/0182590 A1 | 7/2013 | Soulie | |
| 2014/0163875 A1 | 6/2014 | Mund et al. | |
| 2014/0378093 A1 | 12/2014 | Isaksson | |
| 2015/0187099 A1 | 7/2015 | Huyi et al. | |
| 2015/0257050 A1 | 9/2015 | Karimli et al. | |
| 2015/0257124 A1 | 9/2015 | Karimli et al. | |
| 2016/0165517 A1 | 6/2016 | Mcquaid | |
| 2016/0328120 A1 | 11/2016 | Smith | |
| 2016/0335695 A1 | 11/2016 | Gokhale et al. | |
| 2017/0064605 A1 | 3/2017 | Wang et al. | |
| 2017/0078412 A1 | 3/2017 | Wentz | |
| 2017/0150365 A1 | 5/2017 | Goswami et al. | |
| 2017/0171763 A1 | 6/2017 | Mueller et al. | |
| 2017/0367022 A1 | 12/2017 | Chandrasekaran | |
| 2018/0124566 A1 | 5/2018 | Colonna et al. | |
| 2018/0197188 A1 | 7/2018 | Halstead et al. | |
| 2018/0220307 A1 | 8/2018 | Mohammed et al. | |
| 2019/0087840 A1 | 3/2019 | Zachariah et al. | |
| 2019/0150006 A1 | 5/2019 | Yang et al. | |
| 2019/0150026 A1 | 5/2019 | Zhang | |
| 2019/0200241 A1 | 6/2019 | Mohammed et al. | |
| 2019/0379592 A1 | 12/2019 | Samadi | |
| 2019/0380050 A1 | 12/2019 | Mueller et al. | |
| 2019/0392054 A1 | 12/2019 | Courtemanche et al. | |
| 2020/0024930 A1 | 1/2020 | Yang et al. | |
| 2020/0028746 A1 | 1/2020 | Zawadzki et al. | |
| 2020/0029240 A1 | 1/2020 | Li et al. | |
| 2020/0092732 A1 | 3/2020 | Raj et al. | |
| 2020/0162336 A1 | 5/2020 | Gonguet | |
| 2020/0186473 A1 | 6/2020 | Serrano Garcia et al. | |
| 2020/0213900 A1 | 7/2020 | Zhang | |
| 2020/0267058 A1 | 8/2020 | Gray et al. | |
| 2020/0267505 A1 | 8/2020 | Mehran et al. | |
| 2020/0275285 A1 | 8/2020 | Li et al. | |
| 2020/0344694 A1 | 10/2020 | Jangid et al. | |
| 2020/0351698 A1 | 11/2020 | Li et al. | |
| 2020/0404523 A1 | 12/2020 | Yoon | |
| 2021/0037394 A1 | 2/2021 | Wainer et al. | |
| 2021/0065226 A1 | 3/2021 | Zachariah et al. | |
| 2021/0209136 A1 | 7/2021 | Jha et al. | |
| 2023/0138578 A1* | 5/2023 | Azizi | H04W 24/08 370/329 |

* cited by examiner

| Criteria's | Fit 1 540 | Fit 2 545 | Fit 3 550 | Fit 1 555 | Fit 2 560 | Fit 3 565 |
|---|---|---|---|---|---|---|
| Sales 505 | Zip penetration<Market MS | Zip penetration<DMA MS | Zip penetration>DMA MS | Zip penetration>DMA MS | Zip penetration>DMA MS | Zip penetration>DMA MS |
| Planning 510 | IBR<80% & Uncovered pops>5000 | IBR>80% | IBR>80% | IBR>80% 630 | IBR<80% Low Uncovered pops | IBR>80% |
| Network 515 | Detractor/Passive/Promoter | Passive/Promoter | Passive/Promoter | Detractor | Detractor/Passive/Promoter | Passive/Promoter |
| Population 520 | Total pops>500 | Total pops>500 | Total pops>500 | Total pops>500 | Total pops>500 | Total pops>500 |
| Store 525 | | | | | | No store within 30 miles centroid |

TELECOMMUNICATIONS NETWORK PLANNING SYSTEM

CROSS REFERENCE TO RELATED APPLICATION(S)

This application is related to U.S. application Ser. No. 17/554,595, filed on Dec. 17, 2021, the contents of which are incorporated by reference in their entirety.

BACKGROUND

A telecommunications network is established via a complex arrangement and configuration of many cell sites that are deployed across a geographic area. For example, there can be different types of cell sites (e.g., macro cells, micro cells, and so on) positioned in a specific geographical location, such as a city, a neighborhood, and so on. These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a third or fourth generation (3G/4G) mobile communications network (e.g., General Packet Radio Service (GPRS), Enhanced GPRS (EGPRS)), Enhanced Data rates for GSM Evolution (EDGE), a Universal Mobile Telecommunications System (UMTS) or Long-Term Evolution (LTE) network, a 5G mobile communications network, Institute of Electrical and Electronics Engineers (IEEE) 802.11 (Wi-Fi), or other communications network. The devices can seek access to the telecommunications network for various services provided by the network, such as services that facilitate the transmission of data over the network and/or provide content to the devices.

As device usage continues to rise at an impressive rate, there are too many people using too many network- and/or data-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss, and the blocking of new connections, resulting in an overall degraded customer experience. As a result, a customer's experience with a network suffers and often results in a customer switching telecommunications service providers.

BRIEF DESCRIPTION OF THE DRAWINGS

FIG. 5 is an example diagram that illustrates processes (or components of processes) of optimizing coverage in a telecommunications network.

FIGS. 8A-8D are example reports that illustrate analysis of data relating to network planning in a telecommunications network.

Figure 1:
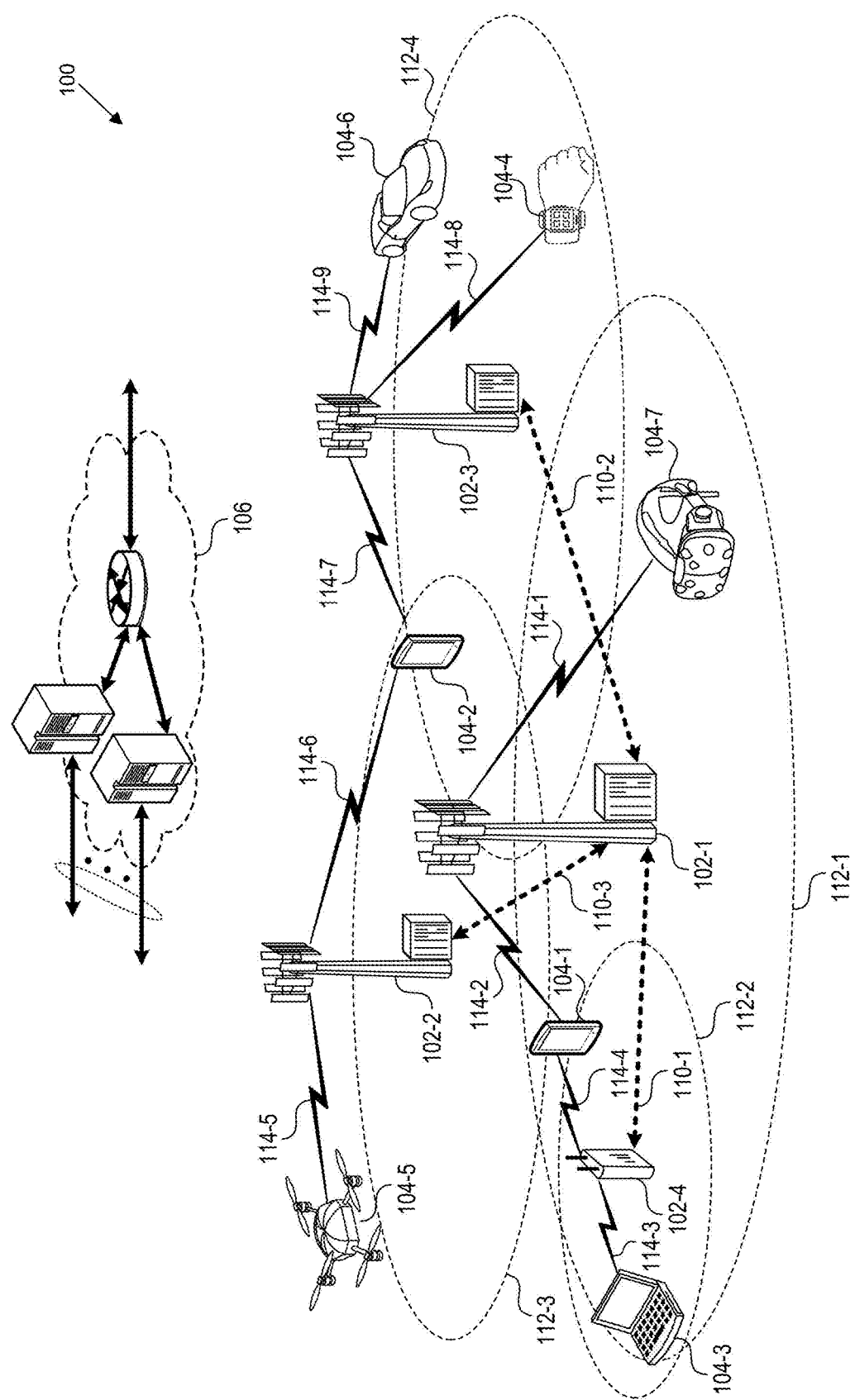
FIG. 1 is a block diagram that illustrates a wireless telecommunication system.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Telecommunications network providers typically spend considerable resources (e.g., engineering resources, sales resources, etc.) in various geographic areas to improve customer experience and grow their network. However, it is difficult for network providers to determine what types of network planning/improvement solutions to employ in an area. For instance, while engineering solutions (e.g., adding a new cell site, adding a new sector, deploying a small cell, etc.) may be suited for one area, sales solutions (e.g., offering discounts, increasing marketing campaign spend, etc.) may be better suited for another area. As another example, after a network provider has deployed engineering solutions in an area to prepare it for handling new/increased customer load, the next step may be to deploy sales solutions to make customers aware of the improvements. Current systems do not provide actionable insights regarding the types of targeted network planning solutions a network provider could deploy to improve customer experience and grow their network share in an area. Furthermore, while existing planning solutions may provide guidance on a high-level network improvement strategy, they fail to provide insights that enable a network provider to take specific actions at lower area granularities, such as at a zip code level. As a result, customers have to suffer through suboptimal coverage and network providers have to expend considerable resources (e.g., engineering resources, monetary resources, etc.) before they can see any positive results.

To solve these and other problems, the inventors have developed a telecommunications network planning system ("network planning system") and method to identify a growth classification/categorization for the area that helps a telecommunications network provider to solve for what types of planning opportunities are available for each location at various area granularities (e.g., sector, cell site, zip code, city, region, state, and so on). The network planning system computes values for a set of growth criteria for a geographic area (e.g., sector, cell site, city, zip code, state, region, etc.). The growth criteria are related to planning, area classification (e.g., detractor/passive/promoter), customer experience, sales, population, and so on. Based on the growth-criteria values, the network planning system identifies a classification/categorization for the area. For example, the network planning system classifies an area as an invest area (e.g., requiring engineering action), a grow area (e.g., requiring sales action/being sales ready), a defend area (e.g., requiring engineering and sales actions to continue current trend), or a fix area (e.g., likely requiring both engineering and sales actions to improve current trend). Based on the area classification, the network planning system can then provide actionable insights to drive improvement in network coverage and customer experience. For example, the network planning system can recommend a network performance solution of spectrum addition to implement in the geographic area to improve network coverage and/or congestion issues. The network planning system can also project changes in the growth criteria and area classification after the network performance solutions are deployed in the geographic area. This can help the network provider plan for and select solutions that will have the maximum impact on network performance and optimize network planning goals. The network planning system provides a robust and extensive dashboard that enables telecommunications service providers to visualize the various metrics generated by the network planning system, perform what-if analysis, project the impact of deploying network performance solutions at area locations, and so on.

In this manner, the network planning system provides an area-holistic solution that enables a telecommunications network provider to identify locations with suboptimum coverage, predict future coverage problems for certain locations, and recommend solutions (e.g., adding a cell site, deploying a small cell, etc.) to optimize telecommunications network coverage in identified locations.

In the following description, for the purposes of explanation, numerous specific details are set forth in order to provide a thorough understanding of implementations of the present technology. It will be apparent, however, to one skilled in the art, that implementations of the present technology can be practiced without some of these specific details.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an IEEE 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
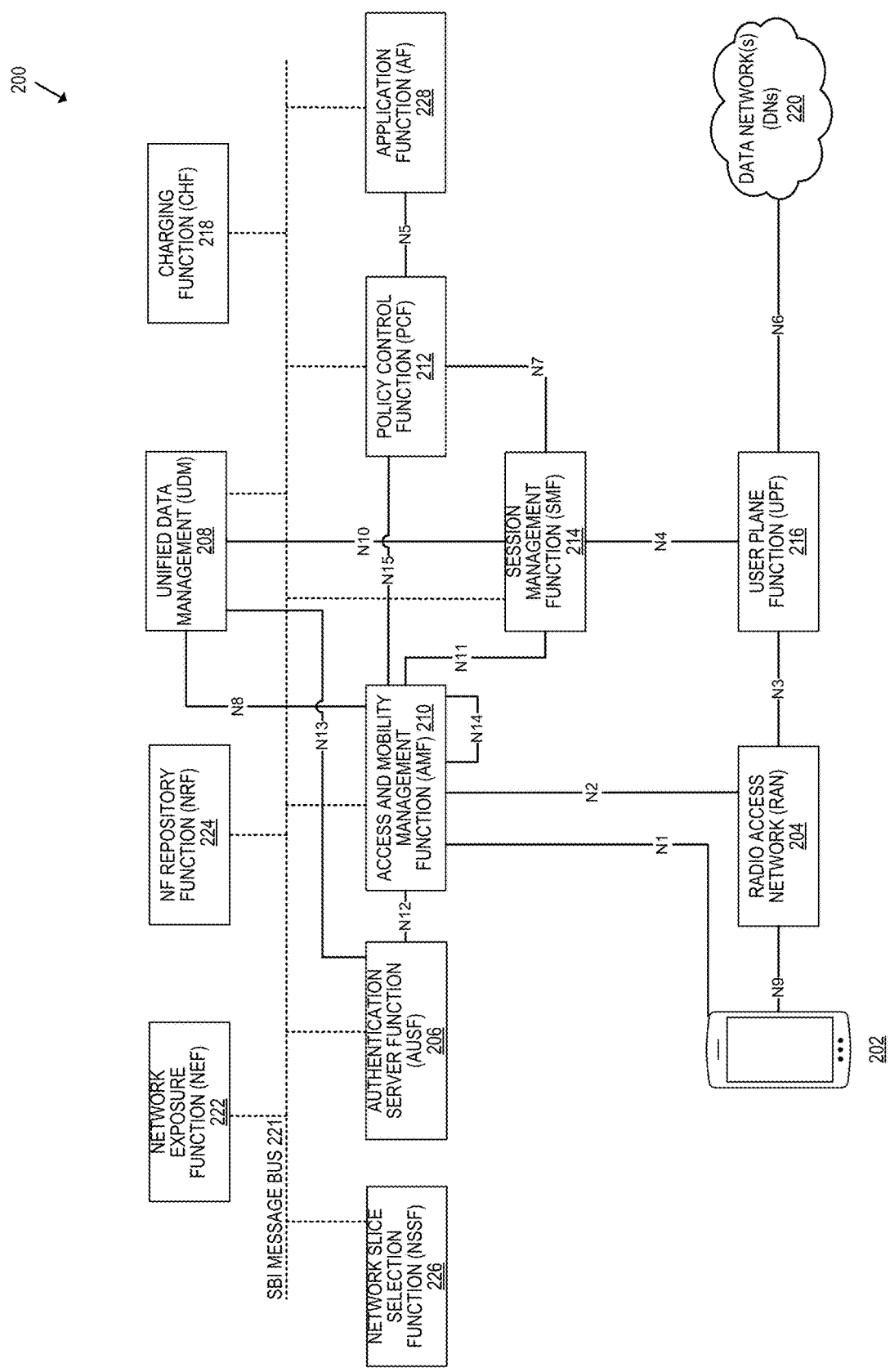
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a radio access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) Message Bus 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP) (not shown).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service and charging rules, includes network slice selection, which is regulated by the NSSF 226.

The Network Planning System

Figure 3:
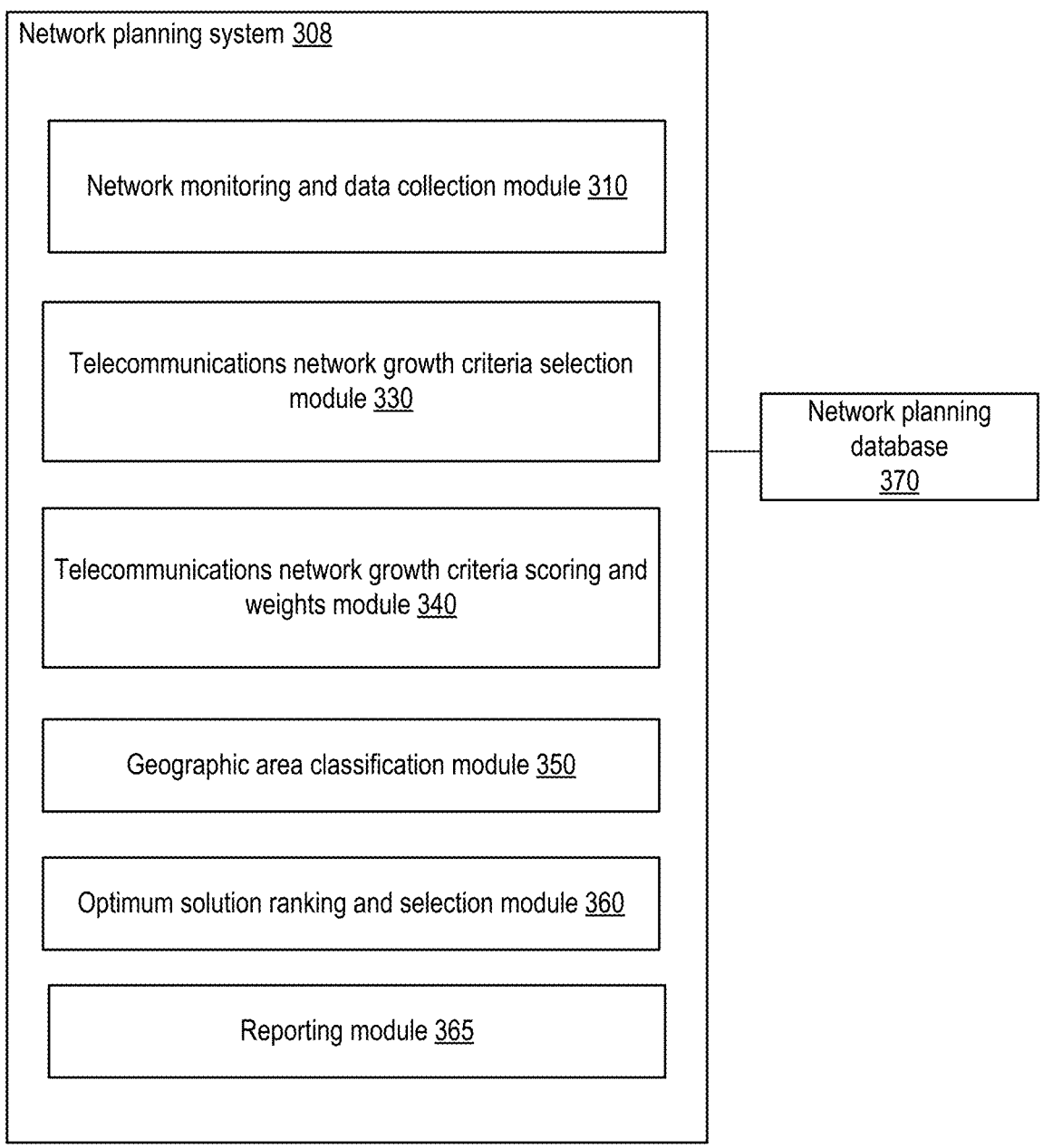
FIG. 3 is a block diagram that illustrates components of a network planning system.

FIG. 3 is a block diagram that illustrates components of a network planning system 308. The network coverage optimization system 308 can include functional modules that are implemented with a combination of software (e.g., executable instructions or computer code) and hardware (e.g., at least a memory and processor). Accordingly, as used herein, in some examples a module is a processor-implemented module or set of code, and it represents a computing device having a processor that is at least temporarily configured and/or programmed by executable instructions stored in memory to perform one or more of the specific functions described herein. For example, the network coverage optimization system 308 can include a network monitoring and data collection module 310, a telecommunications network growth criteria selection module 330, a telecommunications network growth criteria scoring and weights module 340, a geographic area classification module 350, an optimum solution ranking and selection module 360, and a reporting module 365, each of which is discussed separately below.

Network Monitoring and Data Collection Module

The network monitoring and data collection module 310 is configured and/or programmed to monitor telecommunications network data for a geographic area and extract, from that data, values of one or more growth criteria. The network monitoring and data collection module 310 can monitor and extract the values of the growth criteria before a particular network performance improvement solution is deployed (pre-solution deployment), after the particular network performance improvement solution is deployed (post-solution deployment), or both.

The network monitoring and data collection module 310 collects/receives/accesses one or more of the following data records associated with the growth, criteria (which can be stored in a network planning database 370): coverage records (e.g., number of covered users in a geographic area, number of uncovered users in the geographic area, etc.), population of the geographic area, number of voice customers in the geographic area, market share, usability of the geographic area, location specific records (LSRs), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third party, application owner, etc.). The network monitoring and data collection module 310 can collect/generate information about a usability index that reflects the usability of the geographic area as discussed in, for example, Applicants' co-pending patent application Ser. No. 17/554,595 titled TELECOMMUNICATIONS NETWORK COVERAGE OPTIMIZATION SYSTEM. Examples of other types of data collected by the network monitoring and data collection module 310 include, but are not limited to, data collected from third-party applications (e.g., including crowdsourced data) that can help to determine customer experience with location. For example, the network monitoring and data collection module 310 can collect information about a user's location using his/her social media posts (e.g., tweets, check-ins, posts, etc.). As another example, the network monitoring and data collection module 310 collects application-level data (e.g., collected using applications related to IoT devices, sensors, billing meters, traffic lights, etc.) to identify the user location and/or data related to the performance indicators.

In some implementations, the network monitoring and data collection module 310 monitors and/or collects data records corresponding to particular time periods, such as morning, afternoon, evening, busy hours, and so on. The busy hour time period can vary for different geographic areas based on factors such as density of records, frequency of user complaints, frequency of network coverage issues, and so on. For example, the busy hour time period can correspond to rush hour in a geographic area. In some implementations, the telecommunications network data for a geographic area is monitored at a cell level. The network monitoring and data collection module 310 can aggregate network data for various granularities, such as aggregating the cell-level telecommunications network data into sector-level and/or zip code-level telecommunications network data.

Telecommunications Network Growth Criteria Selection Module

The telecommunications network growth criteria selection module 330 is configured and/or programmed to select a set of growth criteria from a set of performance indicators (PIs). The set of PIs comprises hundreds (for example, 200-300) of performance indicators, each of which can be used to measure an aspect of performance of a specific geographic area (e.g., a cell site, sector, zip code, hex bin, region, state, country, and so on). For example, the set of PIs can include some or all of the following performance indicators: sales metrics, planning metrics, network metrics, usability metrics, population metrics, customer metrics (e.g., number of customers, type of customers, etc.), network coverage metrics, usability index, population, store locations, traffic, downlink speed, uplink speed, network measurement, types of handsets, access failures, geographic locations of sectors in the set of sectors, number of sectors used, number of cell sites used, and so on.

From this set of numerous performance indicators, the telecommunications network growth criteria selection module 330 selects a set of network growth criteria to be used to evaluate network coverage and project impact/performance of various network performance improvement solutions. The telecommunications network growth criteria in the set of telecommunications network growth criteria correspond to one or more of the following: network coverage, network planning metrics, network usability, quality of service, data speed, and number of voice customers. The telecommunications network growth criteria selection module 330 selects the subset of network growth criteria based on one or more of the following factors: correlation of each network growth criteria with customer experience, correlation of each network growth criteria with other network growth criteria, user (for example, administrator) preference, telecommunications service provider preference, and so on. For instance, the telecommunications network growth criteria selection module 330 selects performance indicators that exhibit a low degree of correlation yet reflect the dimensions of the overall composite. For example, the telecommunications network growth criteria selection module 330 selects the following network usability indicators as components of the set of network growth criteria: sales, planning, network, population, and store locations. Alternatively or additionally, the telecommunications network growth criteria selection module 330 selects a top threshold number of performance indicators having a maximum correlation with the customer experience. In some implementations, the telecommunications network growth criteria selection module 330 selects the set of network growth criteria based on principal component analysis.

Telecommunications Network Growth Criteria Scoring and Weights Module

The telecommunications network growth criteria scoring and weights module 340 is configured and/or programmed to compute scores and weights for the network growth criteria in the set of network growth criteria. The telecommunications network growth criteria scoring and weights module 340 computes the weights that reflect the relative importance of the network growth criteria and/or minimize interdependence of network growth criteria in the set of network growth criteria (for example, to avoid double counting). The telecommunications network growth criteria scoring and weights module 340 can compute the weights based on principal component analysis. In some implementations, the telecommunications network growth criteria scoring and weights module 340 can compute the weights based on one or more of the following factors: relative importance, number of potential customers available in the geographic area, competition with other providers, customer churn, volume of customer complaints, and so on.

Additionally, the telecommunications network growth criteria scoring and weights module 340 computes score values for the network growth criteria in the set of network growth criteria. To compute the score values, the telecommunications network growth criteria scoring and weights module 340 can evaluate the values monitored and extracted by the network monitoring and data collection module 310. For example, to compute a score value for the sales growth criterion, the telecommunications network growth criteria scoring and weights module 340 first computes a geographic area penetration value (e.g., zip penetration value) as follows:

$$\text{penetration}_{geographic\ area} = \frac{\text{number of customers}_{geographic\ area}}{\text{living population}_{geographic\ area}}$$

For example, the penetration value for a zip code with 500 voice customers and a living population of 1000 is computed as 50%. The penetration value can then be compared with a market share value for the network service provider to yield a score value for the sales growth criterion. For example, when the zip penetration value is less than the market share value, the score value for the sales growth criteria is 0. As another example, the telecommunications network growth criteria scoring and weights module 340 can compute a ratio of the zip penetration value and the market share value and then normalize the result to yield a score value for the sales growth criterion between 0 and 1 (or any other desired range).

Similarly, to compute a score value for the planning growth criterion, the telecommunications network growth criteria scoring and weights module 340 first computes a geographic area in-building residential coverage (IBR) value that is indicative of the amount of covered population as follows:

$$IBR_{geographic\ area} = \frac{\text{number of covered population}_{geographic\ area}}{\text{living population}_{geographic\ area}}$$

For example, the IBR value for a zip code with 4000 covered customers and a living population of 5000 is computed as 80%. The IBR value can then be compared with a threshold value to yield a score value for the sales growth criterion. The threshold value can be based on churn correlation (e.g., by correlating each threshold to churn and picking the threshold where churn started up ticking). For example, when the IBR value is less than the threshold value of 80%, the score value for the planning growth criteria is 0. As another example, the telecommunications network growth criteria scoring and weights module 340 can compute a score value for the planning growth criterion based on the IBR value and the number of uncovered population value.

The usability growth criterion value can be computed using the methods described in Applicants' co-pending patent application Ser. No. 17/554,595 titled TELECOMMUNICATIONS NETWORK COVERAGE OPTIMIZATION SYSTEM, the contents of which are incorporated herein in their entirety. The population growth criterion value can be computed by comparing the population of the geographic area with a threshold value (e.g., 500). The network provider stores growth criterion value can be computed based on a number of stores within a threshold radius distance from the geographic area (for example, number of stores within 30 miles of a zip code).

Geographic Area Classification Module

The geographic area classification module 350 is configured and/or programmed to determine a classification of the geographic area. Examples of classifications include, but are not limited to, the following: invest, grow, defend, fix, and so on. The geographic area classifications can be determined by evaluating the score and/or weight values of one or more of the identified growth criteria. For example, as illustrated in FIG. 5, the following growth criteria are used to generate a classification 540, 545, 550, 555, or 560 for a zip code: sales 505, planning 510, network 515, population 520, and stores 525.

As illustrated in FIG. 5, the zip code area is classified as an invest area 540 when the following criteria are met: sales: zip penetration is less than the market share value; planning: the. IBR value is less than a threshold value of 80% and the uncovered population is greater than a threshold value of 5000; network: the area is classified as a detractor, passive, or promoter area; and population: the total population is greater than 500.

Figure 6:
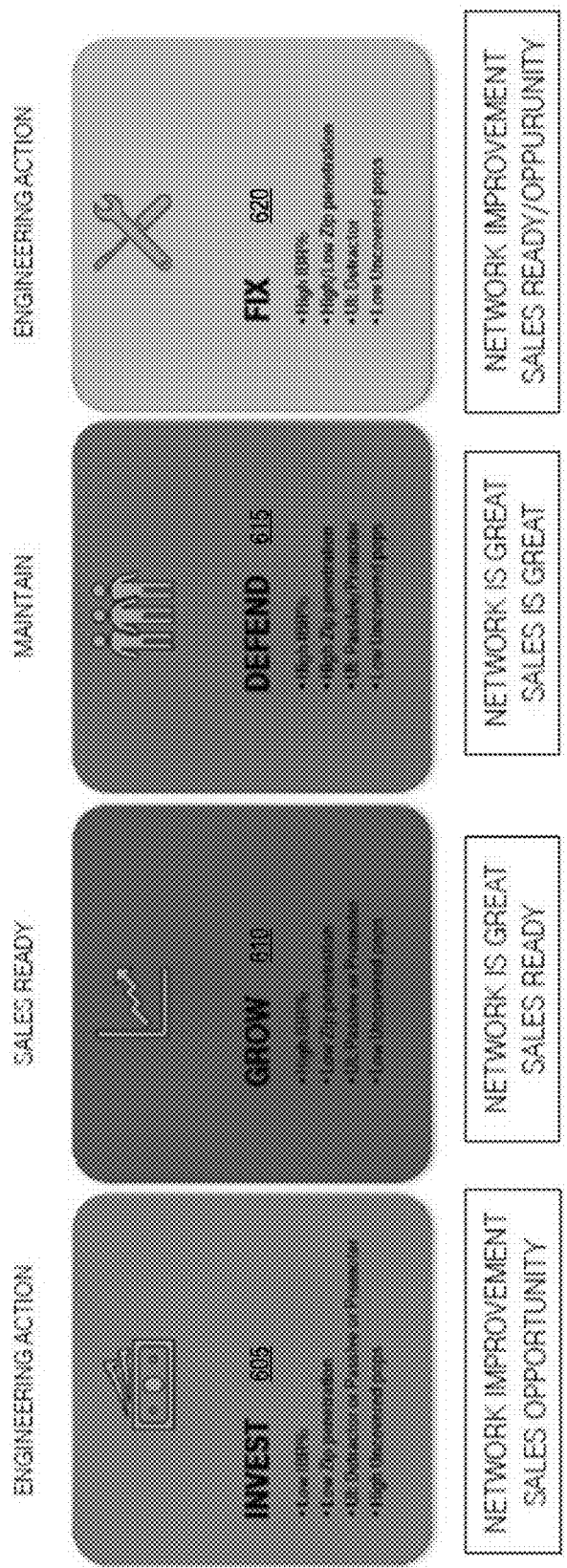
FIG. 6 illustrates some example geographic area classifications.

The geographic area classifications are used to select one or more network performance improvement solutions/actions to deploy at particular geographic areas/sites. For example, an invest classification can denote to the network planning system that telecommunications network coverage in an identified geographic area can be optimized by deploying both engineering and sales-related network improvement solutions. As another example, a grow classification can denote to the network planning system that while the network coverage quality is currently optimal, customer base in the identified geographic area can be optimized by deploying sales-related solutions. FIG. 6 illustrates some example geographic area classifications 605, 610, 615, and 620, and associated network improvement opportunities/solutions. An area can be classified as Fix 1 when it has good, predicted coverage but poor customer experience from mobile measure data. Similarly, an area can be classified as Fix 2 when it has poor predicted coverage with low uncovered pops.

Optimum Solution Ranking and Selection Module

The optimum solution ranking and selection module 360 of FIG. 3 is configured and/or programmed to enable selection of one (or more) network performance improvement solutions/actions to deploy at particular geographic areas/sites. Examples of network performance improvement solutions include, but are not limited to, cell split, small cell deployment, spectrum addition, spectrum removal, sector addition, sector removal, and so on. The optimum solution ranking and selection module 360 evaluates the classifications generated for a geographic area to identify and select one or more solutions as candidates for deployment in that area (for example, at a cell site associated with the area). The optimum solution ranking and selection module 360 can compute the impact of deploying a solution on individual network growth criteria values/scores and/or the overall telecommunications network classification for the geographic area. Growth can be determined based on current market share. For example, assuming a provider has 20% market share in 1000 populated area, the growth is computed to be (40-20)*1000=200 potential lines (40 being the target market share). In some implementations, the optimum solution ranking and selection module 360 evaluates the impact of short-term solutions, medium-term solutions, and long-term solutions to identify an optimum set of solutions to select for the geographic area. The solutions can be ranked in the order of decreasing impact on area classification. In some implementations, the optimum solution ranking and selection module 360 selects the best-performing solution (for example, small cell). The following information can also be stored/displayed about the network performance improvement solutions: solutions count (total number of sites/sectors where the solution is deployed) and percentage of sites/sectors where a classification change occurred.

Figure 7:
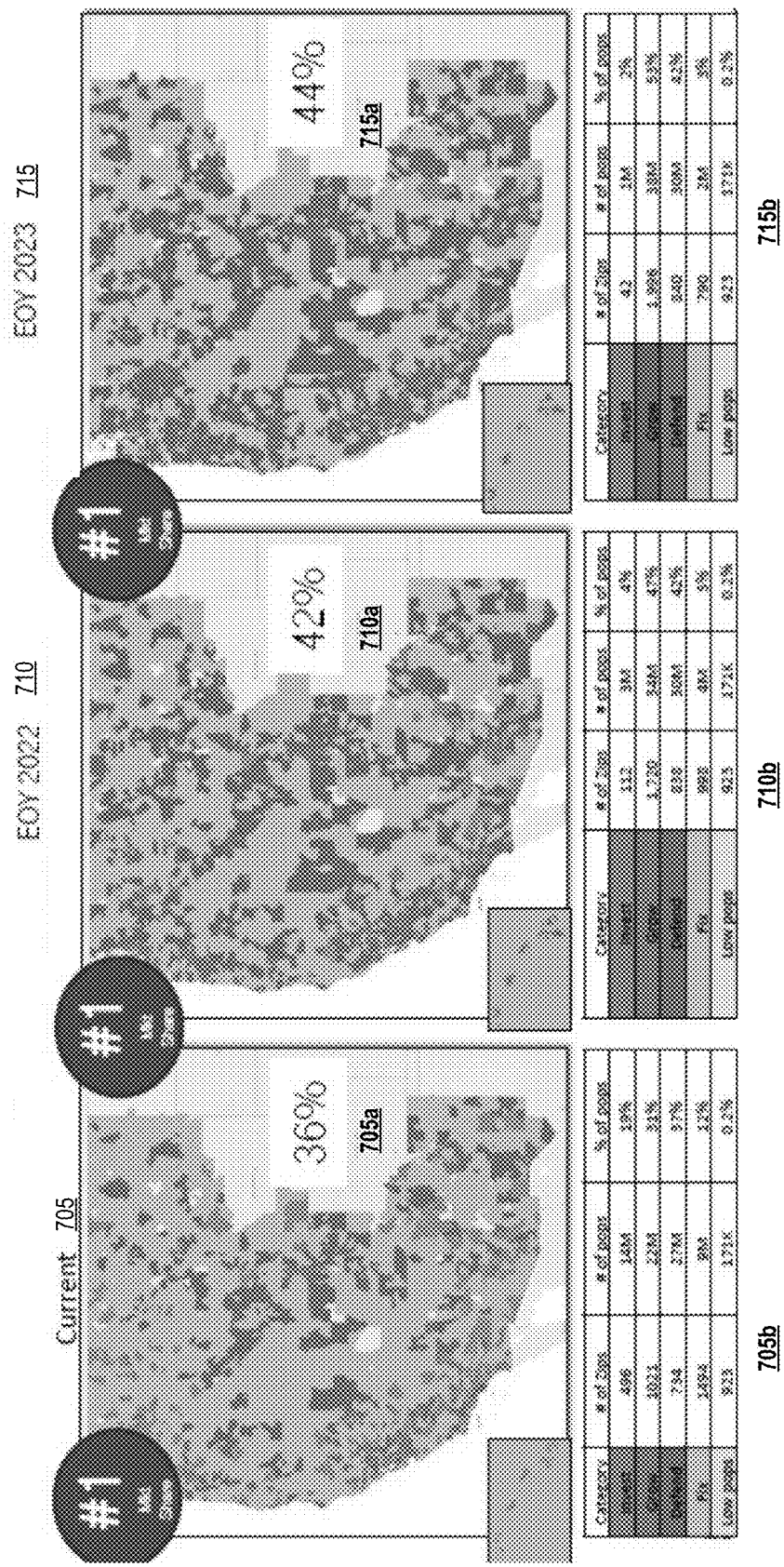
FIG. 7 is an example report that illustrates the impact of deploying various performance improvement solutions/actions on the classifications for various geographic areas in a region.

FIG. 7 illustrates the impact of deploying various performance improvement solutions/actions on the classifications for various geographic areas in a region (western United States) over a period of time (current 705, End of Year 2022 710, and End of Year 2023 715). As illustrated in FIG. 7, the network planning system enables a user to visualize the current and future area classifications in a map format 705a, 710a, and 715a, and/or a table format 705b, 710b, and 715b. For example, FIG. 7(705a, 705b) illustrates zip areas where a service provider can invest in and fix from engineering side versus grow and defend areas for sales-type network performance improvement solutions/actions. Based on the plan of records of network investments for a service provider, the system can predict customer experience and coverage. The system can combine these (and/or other predictions) to generate a predicted value of the growth categories/classifications. For example, an area with a current IBR of 70% IBR and a current usability index value of 70 would be currently classified as an invest area. The system determines that after deploying the identified network performance improvement solutions/actions, the IBR is expected to improve to 90% and the usability index is expected to change to 80. As a result, the area classification will change to a Grow area by EOY 2022. FIG. 7 (710a, 710b, 715a, 715b) illustrates predicted market share based upon the potential lines from grow and defend area. Assuming the service provider has 10% market share, 1000 customers, 10000 current covered population and 2000 potential population to be covered, the system can generate a forecast of current to potential customers (grow and defend areas) which will be (1000+2000)/10000=30% market share potential gain.

Table 705b illustrates the following information about the area classifications/categories (invest, grow, defend, fix, and low population): number of zip codes with that classification, number of impacted residents (#of population), and percentage of population (% of population).

In addition to evaluating the impact on geographic classification of various solutions, the optimum solution ranking and selection module 360 can consider one or more of the following additional factors when ranking and/or selecting optimum solutions: location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rental costs associated with the network performance improvement solution, backhaul availability, cost and duration factors (e.g., cost of deploying a network performance improvement solution, cost of maintaining the network performance improvement solution, expected lifetime of the network performance improvement solution, duration of deploying the network performance improvement solution, lifetime of the network performance improvement solution), similarity between the site where a solution was deployed and the site where the solution is to be deployed, solutions deployed at sites in a selected geographic area, and so on. For example, while the optimum solution ranking and selection module 360 initially selects a small cell solution as an optimum solution based on the impact on geographic classification, it can update its selection to a sector addition solution based on the costs and duration of deployment associated with the various solutions (small cell solutions tend to be more expensive and take a longer time to deploy, as compared to, sector addition solutions).

Reporting Module

Figure 8A:
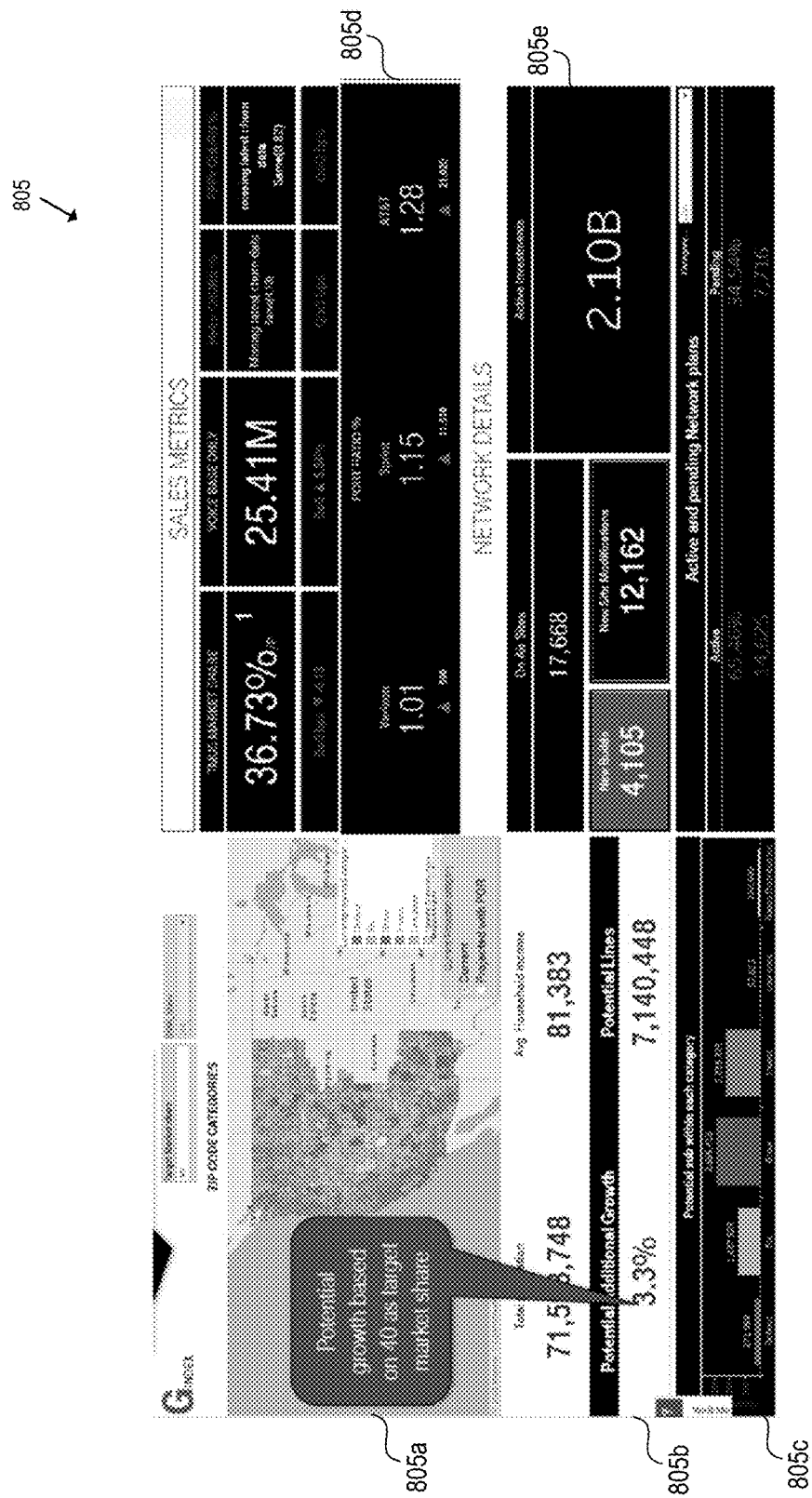

The reporting module 365 of FIG. 3 is configured and/or programmed to generate one or more reports that can be displayed at a user interface. FIGS. 8A-8D are example reports illustrating analysis of data relating to network planning in a telecommunications network. FIG. 8A illustrates a report 805 that displays the classifications/categories for an area (for example, zip code categories for the state of California on a map 805a), as well as details within each category 805c. An area can be classified as "needs distribution" by executing a spatial query through a centroid of the area. When the area is classified as a "grow" area and has no service provider store within a threshold distance (e.g., 30 miles of the radius), the area is classified as "needs distribution." Section 805c shows potential customers a service provider can gain from each zip code category. In addition, report 805 displays the potential for additional growth and the potential lines 805b. A service provider can utilize the information to improve coverage issues. Report 805 can further display one or more metrics comparing the service provider with its competitors 805d, enabling the service provider to identify competitors to whim they are losing market share, competitors from whom they are gaining market share, and so on.

Section 805e illustrates on-air network towers and plan investments. Some are new builds (brand new location) and some are modifications. Their total sum is roughly equivalent to around 2B dollars. This give insights of how much a service provider has and how much it can plan to add in the future.

Figure 8B:
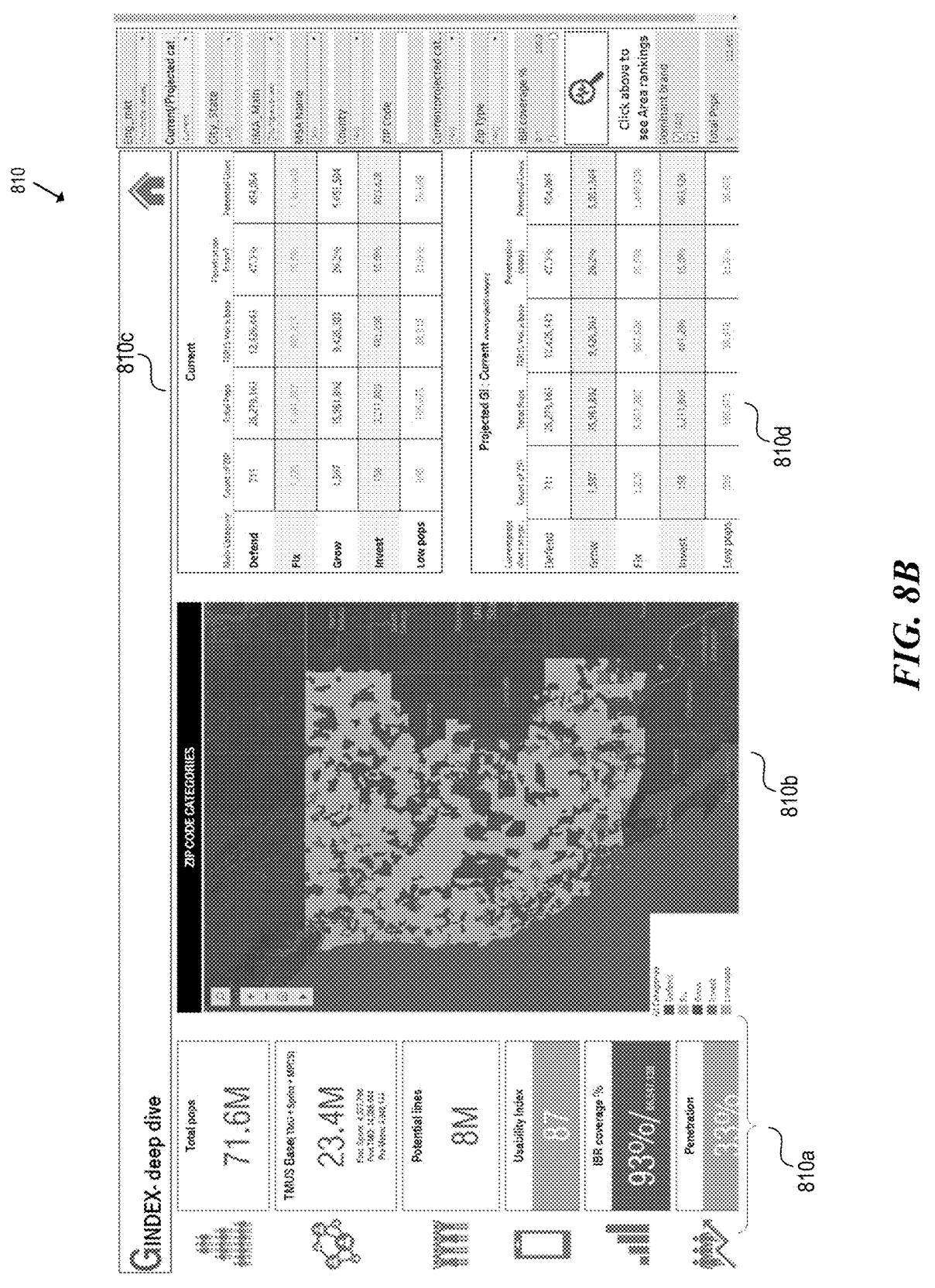

FIG. 8B illustrates a report 810 that displays a current view and a projected view for a geographic area. For example, report 810 can display a section 810a illustrating various metrics associated with a geographic area (e.g., total population, number of customers, potential lines, usability index, IBR coverage %, and market penetration). In addition, report 810 can display a map (810b) plotting the zip codes and their associated categories. Report 810 can further display the current growth categorization 810c of the geographic area and the projected growth categorization 810d of the geographic area. The information illustrated in report 810 can be used to determine how much total population, potential lines, customers a service provider has in each category of zip code. It enables drill down on any particular county, MSA, City. This drill down enables a service provider to view current state information as well as future state information (e.g., by selecting filters on right to select various years, such as 2022, 2023 and so on). This is very powerful because it enables a sales team to identify when an area will be ready for certain performance improvement solutions/actions, and enables an for engineering team to plan the solutions if an area is invest even after 2020 build plan.

Figure 8C:
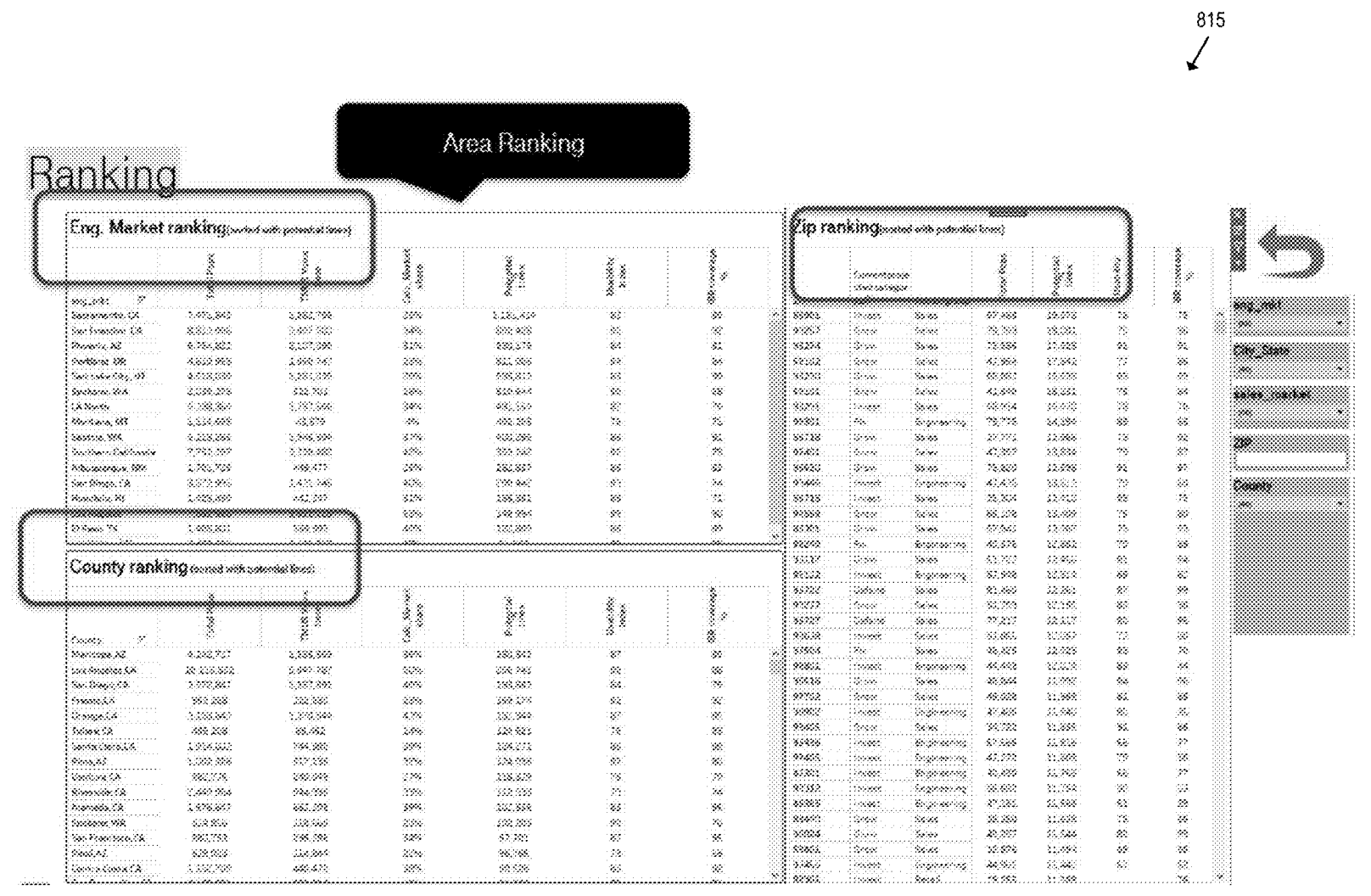
Figure 8D:
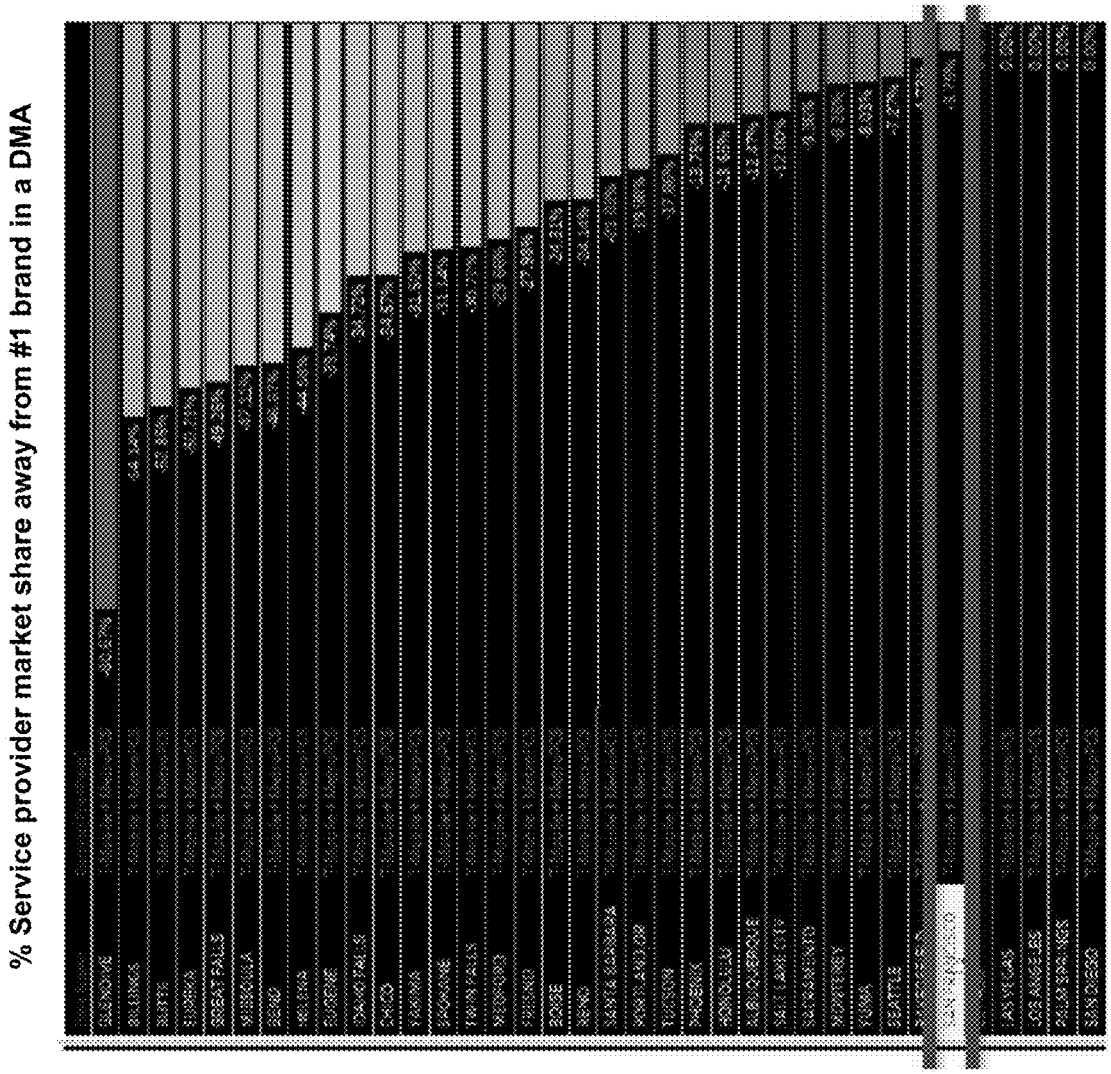

FIGS. 8C and 8D illustrate reports 815 and 820, respectively, which display various, geographic areas and their associated rankings. «Question for inventors—as before, can you add more explanation about what this screen is displaying? How can the controls on the right be used to alter the info displayed on the left? How is this info used by sales and networking teams to make intelligent decisions?» Reports 815 and 820 enable a service provider to identify priority areas. For example, using the example reports illustrated in FIGS. 8C and 8D, a service provider can identify Sacramento as having #1 market for potential growth. Once Sacramento is selected, a user can identify lower granularity areas within the selected area (e.g., Sacramento) for network planning purposes.

Flow Diagrams

Figure 4:
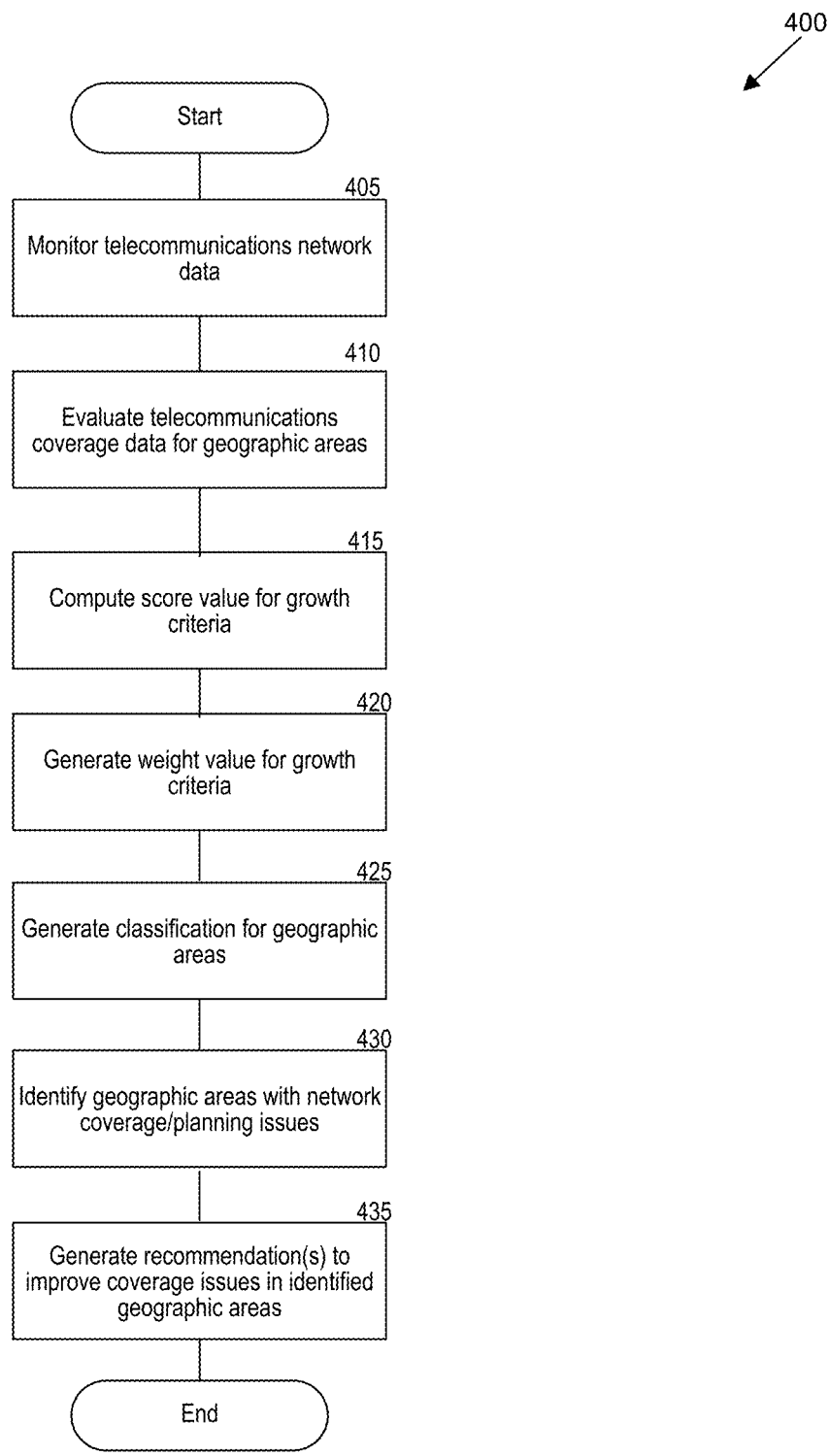
FIG. 4 is a flow diagram that illustrates a process of optimizing coverage in a telecommunications network.

FIG. 4 is a flow diagram illustrating a process of optimizing coverage in a telecommunications network. At block 405, process 400 monitors telecommunications network data (e.g., for a geographic area). At block 410, process 400 evaluates telecommunications coverage data for one or more geographic areas. For example, process 400 examines the telecommunications coverage data for a geographic area and selects a set of network growth criteria to be used to evaluate network coverage and project impact/performance of various network performance improvement solutions. The telecommunications network growth criteria in the set of telecommunications network growth criteria correspond to one or more of the following: network coverage, network planning metrics, network usability, quality of service, data speed, and number of voice customers.

At block 415, process 400 computes values of each telecommunications network growth criterion in the set of telecommunications network growth criteria. At block 420, process 400 generates a weight for each telecommunications network growth criterion in the set of telecommunications network growth criteria. Using the values and the weights of the telecommunications network growth criteria in the set of telecommunications network growth criteria, at block 425, process 400 computes a classification/categorization for the geographic area(s). At block 430, process 400 uses the computed classification/categorization to identify whether one or more of the geographic areas have any network coverage/planning issues. At block 435, process 400 can use the computed classification/categorization for the geographic area(s) to provide data for selecting an optimum network performance improvement solution to be implemented at the geographic area to improve coverage issues.

Computer System

Figure 9:
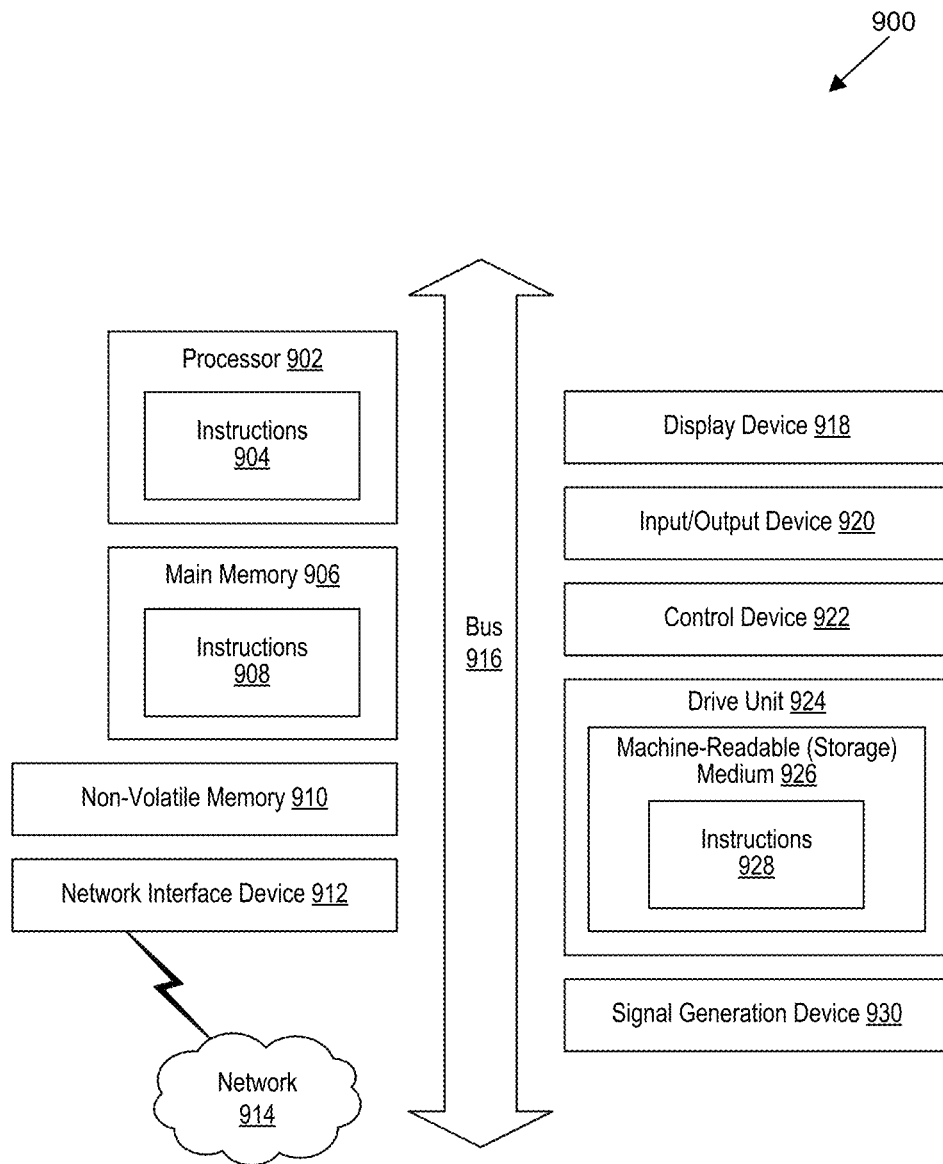
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include one or more processors 902, main memory 906, non-volatile memory 910, a network interface device 912, a display device 918, an input/output device 920, a control device 922 (e.g., a keyboard and pointing device), a drive unit 924 that includes a machine-readable (storage) medium 926, and a signal generation device 930, all of which are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can have an architecture similar to that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or it may include one or more cloud components in one or more networks. Where appropriate, one or more computer systems 900 can perform operations in real time, in near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, and machine-readable (storage) medium 926) can be local, remote, or distributed. Although shown as a single medium, the machine-readable (storage) medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable (storage) medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternatives or subcombinations. Each of these processes, message/data flows, or blocks can be implemented in a variety of different ways. Also, while processes or blocks are at times shown as being performed in series, these processes or blocks can instead be performed in parallel or can be performed at different times. Further, any specific numbers noted herein are only examples: alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements. The teachings of the methods and system provided herein can be applied to other systems, not necessarily the system described above. The elements, blocks, and acts of the various implementations described above can be combined to provide further implementations.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicants contemplate various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicants reserve the right to pursue such additional claim forms either in this application or in a continuing application.

These and other changes can be made to the invention in light of the above Detailed Description. While the above description describes certain implementations of the technology and describes the best mode contemplated, no matter how detailed the above appears in text, the invention can be practiced in many ways. Details of the system can vary considerably in their implementation while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

The invention claimed is:

1. A system for identifying geographic areas in which to improve telecommunications network congestion, the system comprising:
at least one hardware processor;
at least one non-transitory memory, coupled to the at least one hardware processor and storing instructions, which, when executed by the at least one hardware processor, perform a process, the process comprising:
monitoring telecommunications network data for a geographic area;
evaluating telecommunications coverage data for the geographic area;
computing, from the telecommunications network data and the telecommunications coverage data, values of growth criteria in a set of telecommunications growth criteria for the geographic area,
wherein the growth criteria in the set of telecommunications growth criteria correspond to at least two of the following:
telecommunications network planning, telecommunications network usability, or telecommunications network coverage;
generating a weight for each growth criteria in the set of telecommunications growth criteria;

generating a classification of the geographic area using the computed values and weights of the growth criteria,
wherein the geographic area is classified as an invest area, a grow area, a defend area, or a fix area; and
using the generated classification of the geographic area to provide data for selecting an optimum network performance improvement solution from a set of network performance improvement solutions to be implemented in at least one network site or node in the geographic area.

2. The system of claim 1, wherein the process monitors the telecommunications network data for the geographic area during one or more busy hours.

3. The system of claim 1, wherein the set of telecommunications growth criteria comprises:
zip penetration,
number of customers in the geographic area,
number of customer lines in the geographic area,
population of the geographic area,
market share,
network coverage,
in-building residential coverage (IBR),
network classification of the geographic area,
number of service provider locations in the geographic area, or
any combination thereof.

4. The system of claim 3, wherein the network classification of the geographic area is one of: a detractor area, a passive area, or a promoter area.

5. The system of claim 1, wherein the weights for growth criteria are computed using principal component analysis.

6. The system of claim 1, wherein the weights for growth criteria are computed to minimize interdependence of growth criteria in the set of growth criteria.

7. The system of claim 1, wherein the telecommunications network data for a geographic area is monitored at a cell level, and wherein the process further comprises aggregating the cell-level telecommunications network data into sector-level telecommunications network data.

8. The system of claim 1, wherein the set of network performance improvement solutions comprises:
cell split,
small cell deployment,
spectrum addition,
spectrum removal,
sector addition,
sector removal, or
any combination thereof.

9. The system of claim 1, wherein the set of growth criteria comprises a top threshold number of growth criteria having a maximum correlation with customer experience.

10. The system of claim 1, wherein the set of growth criteria comprises growth criteria having low degrees of correlation with each other.

11. The system of claim 1, wherein the instructions, when executed by the at least one hardware processor, further perform a process comprising:
for each growth criterion, projecting a change in value of the growth criterion if a network performance improvement solution were to be implemented in at least one network site or node in the geographic area,
wherein the optimum network performance improvement solution is projected to provide a maximum positive change in values of a majority of the growth criteria.

12. The system of claim 1, wherein the instructions, when executed by the at least one hardware processor, further perform a process comprising:
for each growth criterion, projecting a change in a number of users with a better experience if a network performance improvement solution were to be implemented in at least one network site or node in the geographic area,
wherein the optimum network performance improvement solution is projected to provide a maximum positive change in values of a majority of the growth criteria.

13. The system of claim 1, wherein the geographic area is a sector, a cell site, a zip code, a city, a region, or a state.

14. A computer-implemented method for identifying geographic areas in which to improve telecommunications network congestion, the method comprising:
monitoring telecommunications network data for a geographic area;
evaluating telecommunications coverage data for the geographic area;
computing, from the telecommunications network data and the telecommunications coverage data, values of growth criteria in a set of telecommunications growth criteria for the geographic area,
wherein the growth criteria in the set of telecommunications growth criteria correspond to at least two of the following:
telecommunications network planning, telecommunications network usability, or telecommunications network coverage;
generating a weight for each growth criteria in the set of telecommunications growth criteria;
generating a classification of the geographic area using the computed values and weights of the growth criteria,
wherein the geographic area is classified as an invest area, a grow area, a defend area, or a fix area; and
using the generated classification of the geographic area to provide data for selecting an optimum network performance improvement solution from a set of network performance improvement solutions to be implemented in at least one network site or node in the geographic area.

15. The method of claim 14, wherein the set of telecommunications growth criteria comprises:
zip penetration,
number of customers in the geographic area,
number of customer lines in the geographic area,
population of the geographic area,
market share,
network coverage,
in-building residential coverage (IBR),
network classification of the geographic area,
number of service provider locations in the geographic area, or
any combination thereof.

16. The method of claim 14, wherein the set of network performance improvement solutions comprises:
cell split,
small cell deployment,
spectrum addition,
spectrum removal,
sector addition,
sector removal, or
any combination thereof.

17. The method of claim 14, further comprising:
for each growth criterion, projecting a change in: (1) value of the growth criterion, or (2) a number of users with a better experience, or (3) both, if a network performance improvement solution were to be implemented in at least one network site or node in the geographic area,
  wherein the optimum network performance improvement solution is projected to provide a maximum positive change in values of a majority of the growth criteria.

18. At least one non-transitory, computer-readable storage medium carrying instructions, which, when executed by at least one data processor, perform operations for identifying geographic areas in which to improve telecommunications network congestion, the operations comprising:
  receiving, at a graphical user interface, a selection of a geographic area;
  determining a set of sub-areas within the selected geographic area;
  for each sub-area in the set of sub-areas within the selected geographic area:
    evaluating, for the sub-area, a current classification of the sub-area as being an invest area, a grow area, a defend area, or a fix area,
      wherein at least two sub-areas in the set of sub-areas within the selected geographic area have a different classification;
    determining a set of network performance improvement solutions to be implemented in at least one network site or node in the sub-area;
    evaluating, for the sub-area, a projected classification of the sub-area as being an invest area, a grow area, a defend area, or a fix area if one or more of the set of network performance improvement solutions were implemented in at least one network site or node in the sub-area; and
    displaying, at the graphical user interface, the current classification of the sub-area and the projected classification of the sub-area.

19. The at least one non-transitory, computer-readable storage medium of claim 18, wherein the operations further comprise:
  displaying, at the graphical user interface, an interactive map of the geographic area,
    wherein the interactive map further displays indicators depicting sub-areas within the geographic area and the associated current classifications of the sub-areas.

20. The at least one non-transitory, computer-readable storage medium of claim 18, wherein the operations further comprise:
  displaying, at the graphical user interface, an interactive map of the geographic area,
    wherein the interactive map further displays indicators depicting sub-areas within the geographic area and the associated current classifications of the sub-areas; and
  in response to a user selection of a projected view, displaying the projected classifications of the sub-areas.

* * * * *